Figure 2:
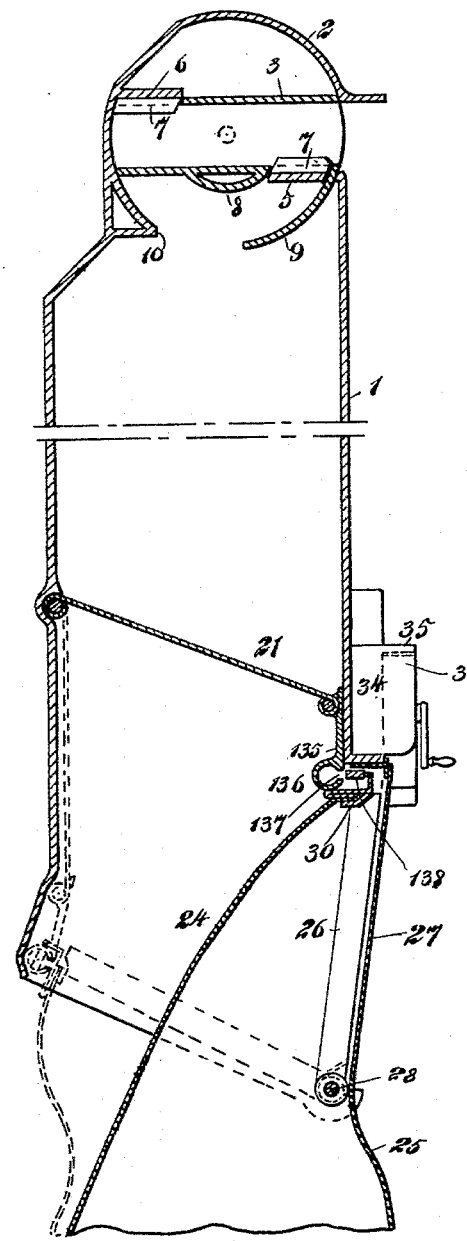

(No Model.) 7 Sheets—Sheet 1.

D. DI BRAZZA SAVORGNAN.
POST DEPOSITING AND COLLECTING RECEPTACLE, &c.

No. 597,437. Patented Jan. 18, 1898.

WITNESSES:
Donn Twitchell
C. R. Ferguson

INVENTOR
D. di Brazza Savorgnan
BY
munn
ATTORNEYS.

THE NORRIS PETERS CO., PHOTO-LITHO., WASHINGTON, D. C.

(No Model.) 7 Sheets—Sheet 2.

D. DI BRAZZA SAVORGNAN.
POST DEPOSITING AND COLLECTING RECEPTACLE, &c.

No. 597,437. Patented Jan. 18, 1898.

WITNESSES:
INVENTOR
D. di Brazza Savorgnan
BY
ATTORNEYS.

(No Model.) 7 Sheets—Sheet 4.

D. DI BRAZZA SAVORGNAN.
POST DEPOSITING AND COLLECTING RECEPTACLE, &c.

No. 597,437. Patented Jan. 18, 1898.

WITNESSES:
Donn Twitchell
C R Ferguson

INVENTOR
D. di Brazza Savorgnan
BY
ATTORNEYS.

(No Model.) 7 Sheets—Sheet 5.

D. DI BRAZZA SAVORGNAN.
POST DEPOSITING AND COLLECTING RECEPTACLE, &c.

No. 597,437. Patented Jan. 18, 1898.

WITNESSES:
Donn Twitchell
C. R. Ferguson

INVENTOR
D. di Brazza Savorgnan
BY
ATTORNEYS.

(No Model.) 7 Sheets—Sheet 6.

D. DI BRAZZA SAVORGNAN.
POST DEPOSITING AND COLLECTING RECEPTACLE, &c.

No. 597,437. Patented Jan. 18, 1898.

FIG. 11ª.

WITNESSES:
Donn Twitchell
C. R. Ferguson

INVENTOR
D. di Brazza Savorgnan
BY
ATTORNEYS.

(No Model.) 7 Sheets—Sheet 7.
D. DI BRAZZA SAVORGNAN.
POST DEPOSITING AND COLLECTING RECEPTACLE, &c.
No. 597,437. Patented Jan. 18, 1898.
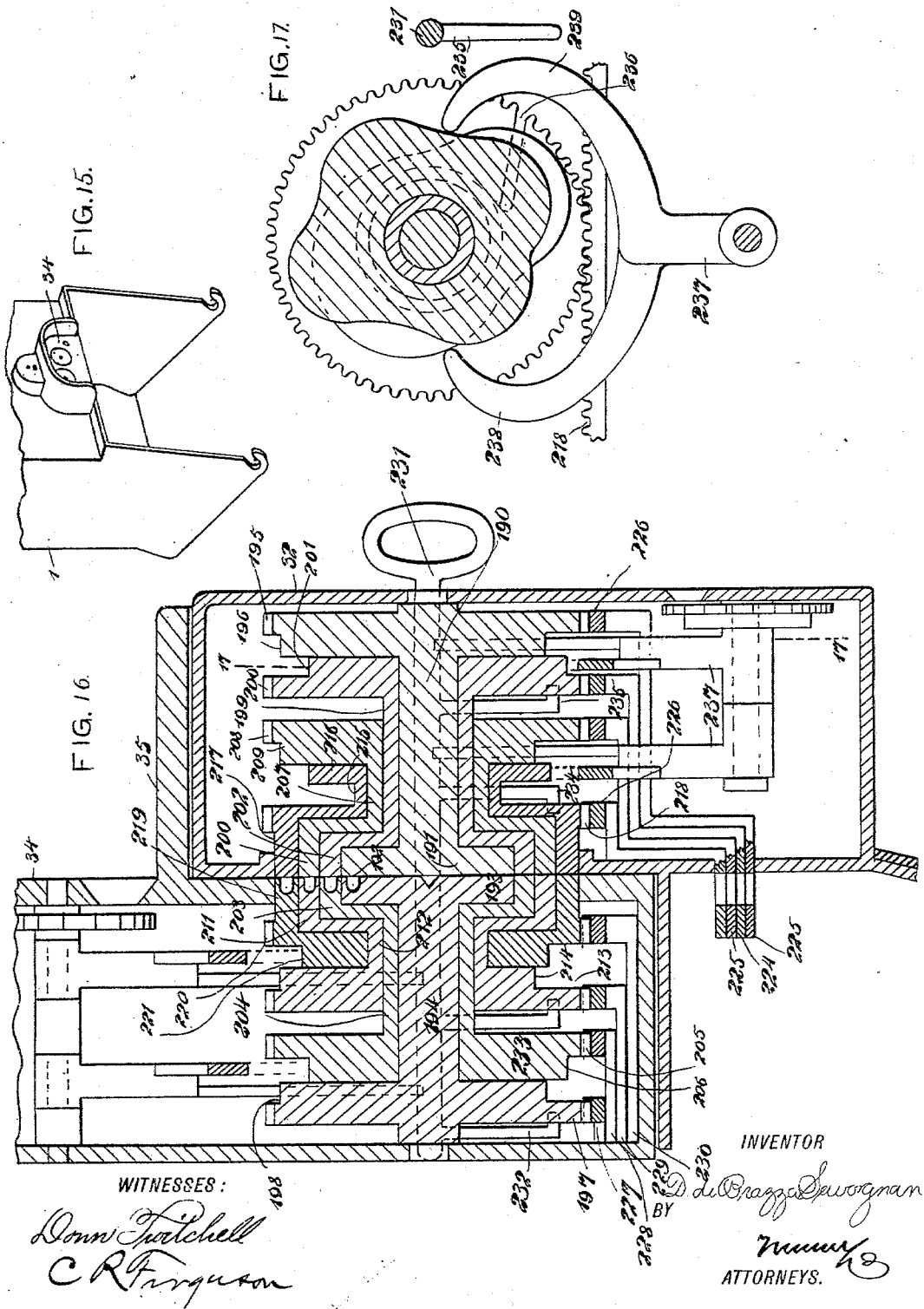

UNITED STATES PATENT OFFICE.

DETALMO DI BRAZZA SAVORGNAN, OF ROME, ITALY, ASSIGNOR TO CORA A. S. DI BRAZZA SAVORGNAN, OF SAME PLACE.

POST DEPOSITING AND COLLECTING RECEPTACLE, &c.

SPECIFICATION forming part of Letters Patent No. 597,437, dated January 18, 1898.

Application filed August 29, 1896. Serial No. 604,325. (No model.)

*To all whom it may concern:*

Be it known that I, DETALMO DI BRAZZA SAVORGNAN, of Rome, Italy, have invented a new and Improved Post Depositing and Collecting Receptacle and Locking and Releasing Mechanism Therefor, of which the following is a full, clear, and exact description.

It is well known that in the ordinary methods of collecting mail-matter from street-boxes the street-box is opened by the collector by means of a key, and then the collector manually removes the mail-matter from said box and deposits it in a bag or other receptacle, which is at all times open or easy of access. By means of this method of collecting mail-matter it is obvious that a dishonest collector may abstract and appropriate letters that contain valuables.

The object of my present invention is to provide a means whereby neither the depositing-receptacle nor the collecting-receptacle can be opened excepting when the two receptacles are placed together. At this time both the depositing-receptacle and the receiving-receptacle may be opened, so that the contents of the depositing-receptacle will drop into the receiving-receptacle, after which the two receptacles must be locked before they can be separated one from the other. It is to be understood, however, that a lock-section similar to that of a depositing-receptacle is to be placed in a general place of deposit, such as a post-office, so that the receiving-receptacle may be opened for the removal of collected matter.

My invention comprises a lock consisting of two sections adapted to coact, one of said sections being attached to the depositing-receptacle and the other of said sections being attached to the receiving-receptacle.

The invention further consists in the construction and novel arrangement of parts, as will be hereinafter specified, and particularly pointed out in the claims.

Reference is to be had to the accompanying drawings, forming a part of this specification, in which similar characters of reference indicate corresponding parts in all the views.

Figure 1:
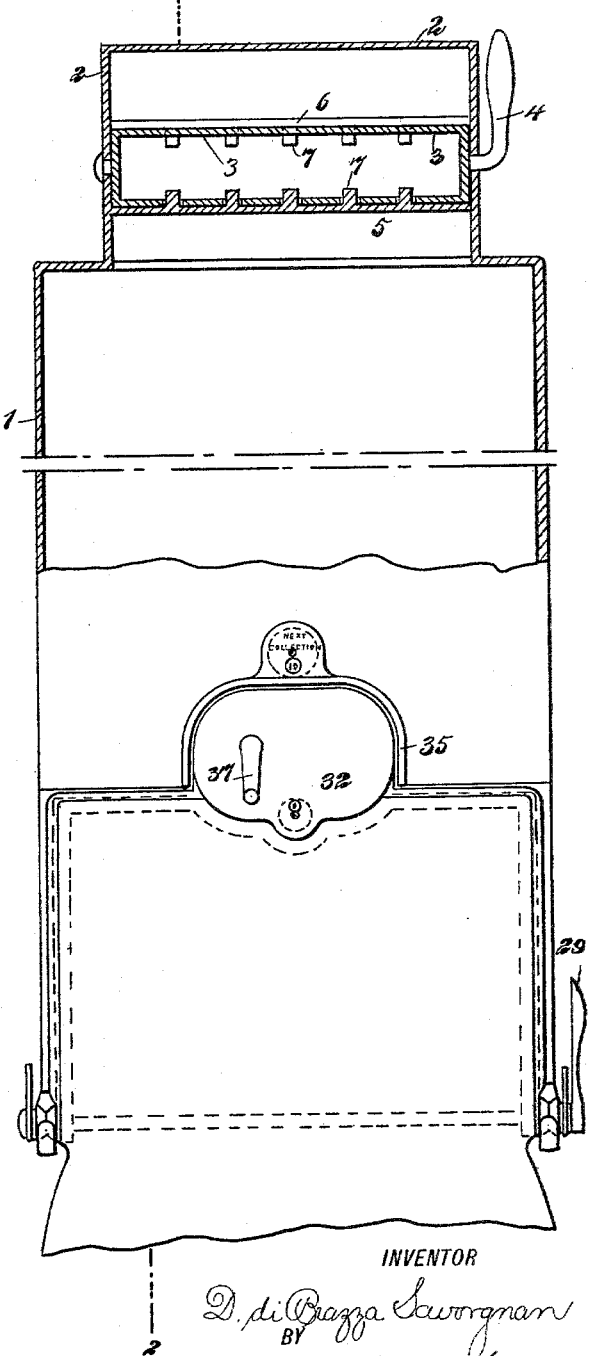
Figure 3:
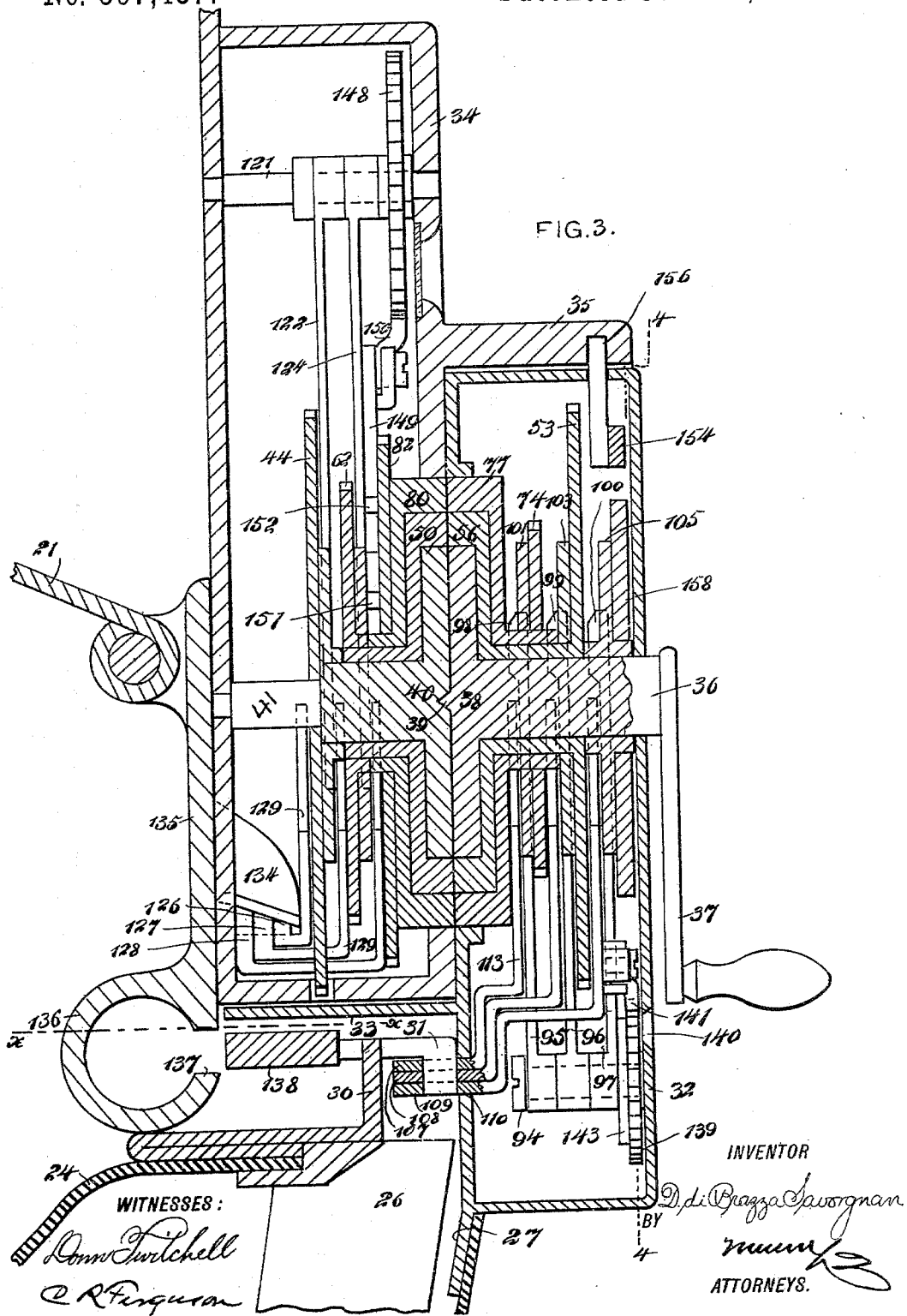
Figure 4:
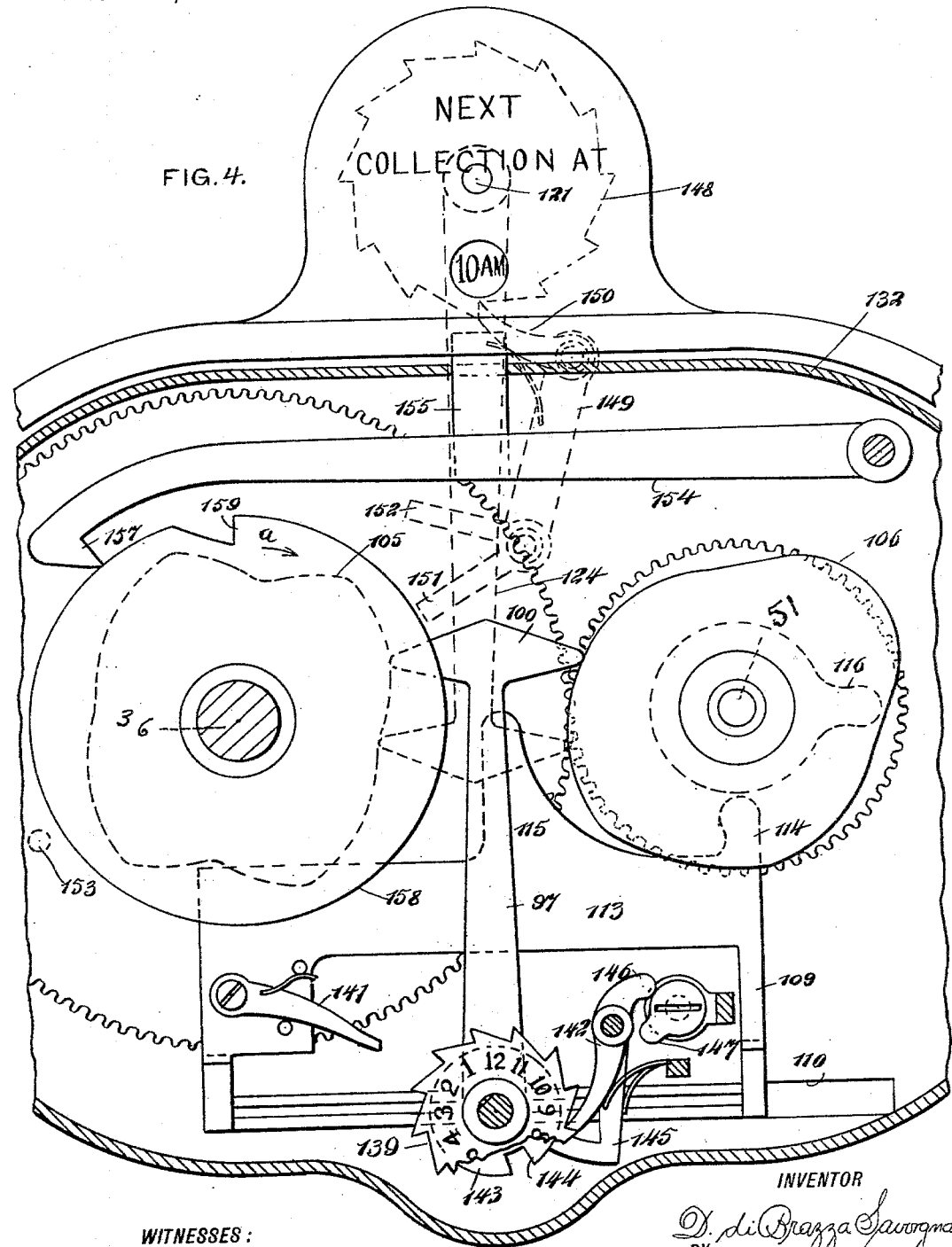
Figure 5:
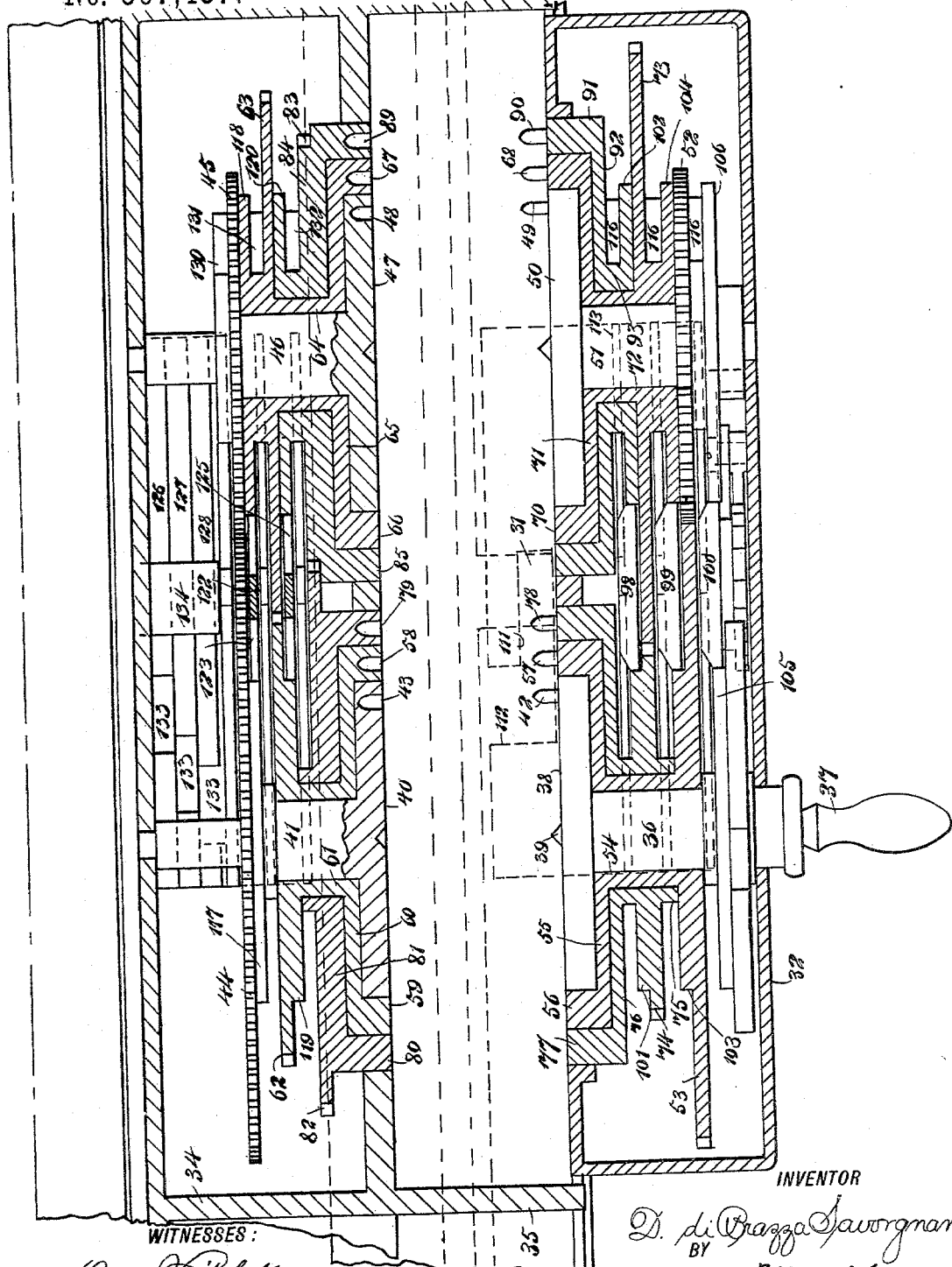
Figure 7:
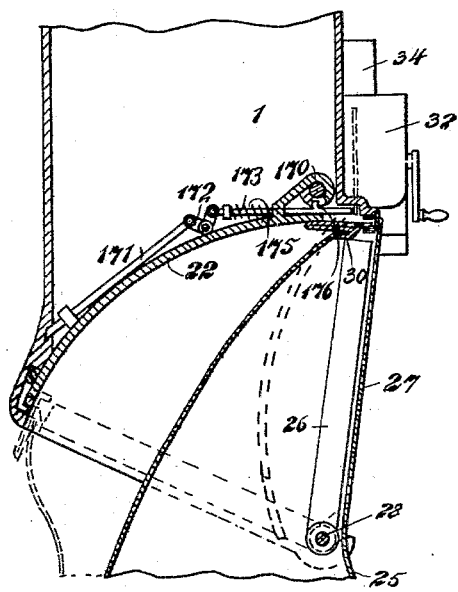
Figure 6:
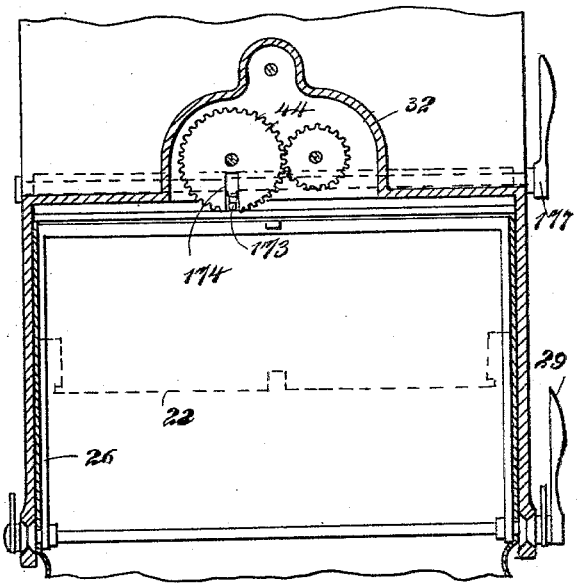
Figure 9:
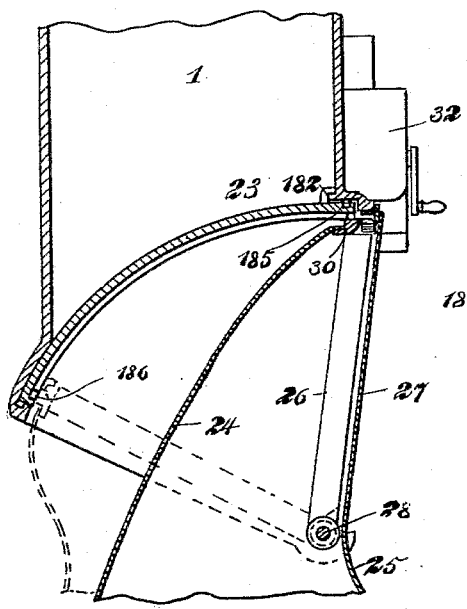
Figure 8:
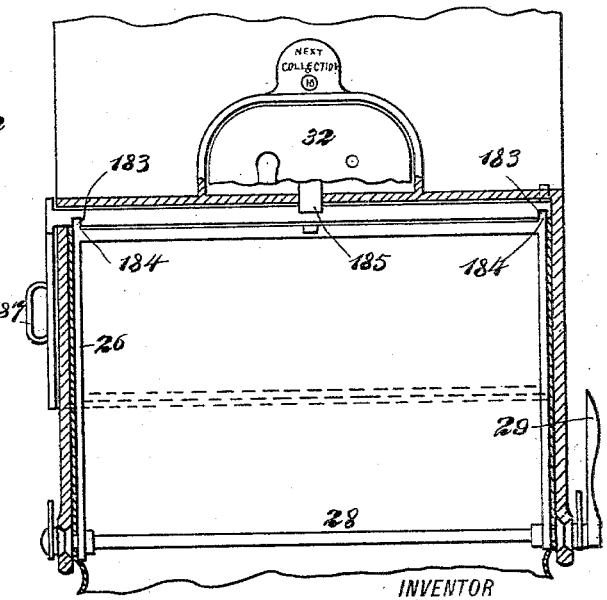
Figure 10:
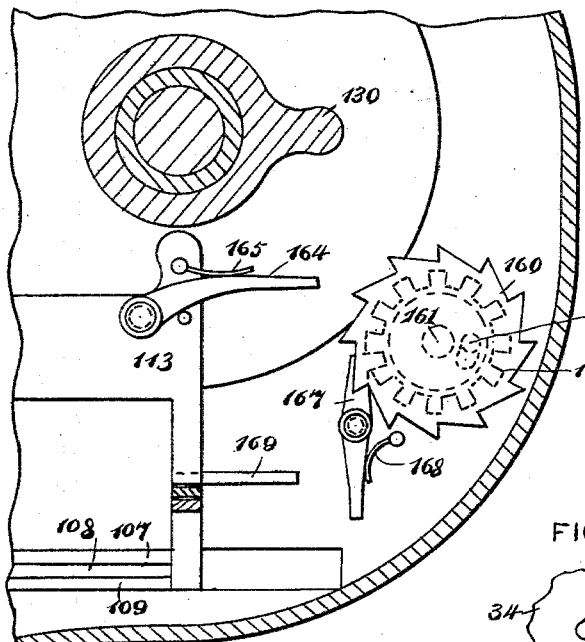
Figure 11:
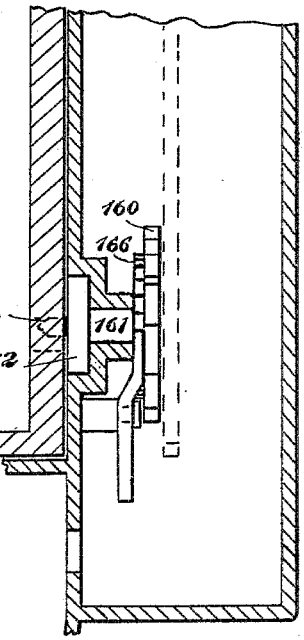
Figure 12:
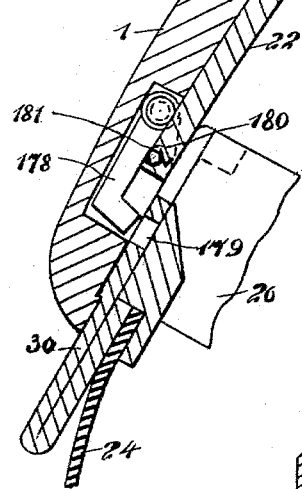
Figure 14:
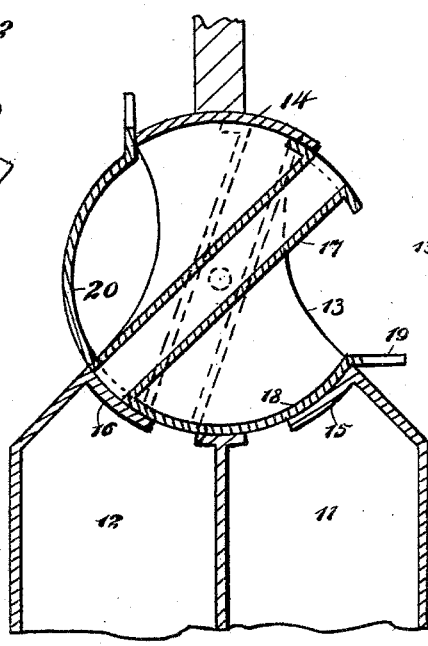
Figure 13:
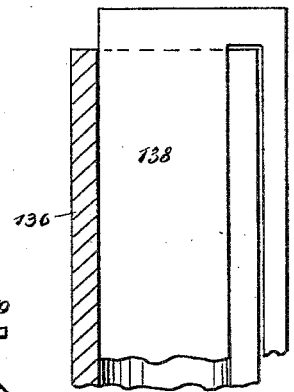

Figure 1 is a partial front elevation and partial section of a depositing-receptacle and a receiving-receptacle embodying my invention. Fig. 2 is a section on the line 2 2 of Fig. 1. Fig. 3 is a vertical section, drawn on an enlarged scale, of the lock-sections employed. Fig. 4 is a section substantially through the line 4 4 of Fig. 3. Fig. 5 is a horizontal section of the lock. Fig. 6 is a vertical section showing a modified construction of the depositing-receptacle. Fig. 7 is a vertical section at right angles to Fig. 6. Fig. 8 is a vertical section showing still another modification. Fig. 9 is a section at right angles to Fig. 8. Fig. 10 is a partial section and partial elevation of a portion of the lock mechanism. Fig 11 is a section at right angles to Fig. 10. Fig. 11$^a$ is a view of the front portion of a depositing-receptacle, showing a certain locking means employed. Fig. 12 is a sectional detail showing a means for interlocking one jaw of the receiving-receptacle with a portion of the depositing-receptacle. Fig. 13 is a section through the line $x\ x$ of Fig. 3. Fig. 14 is a vertical section showing a modification in the construction of the depositing-receptacle. Fig. 15 is a perspective view of the lower portion of the depositing-receptacle, showing its depending side walls or wings. Fig. 16 is a vertical section of a locking mechanism of modified construction, and Fig. 17 is a section on the line 17 17 of Fig. 16.

I will first describe a depositing-receptacle comprised in my invention.

In Figs. 1 and 2, 1 designates the box-like body portion of the receptacle, having at its top a cylindrical shell 2, which, however, opens into the interior of the receptacle 1, and which also has an outward opening through which mail-matter may be inserted into a chute 3, open at its opposite sides and having its end walls provided with trunnions engaging in bearings in the end walls of the shell 2. One of the trunnions is extended outward through an end wall of the shell and is provided with a handpiece or crank 4.

The chute 3 extends entirely across the shell 2, and when it is in its normal position its front open end will be coincident with the outward opening through the shell and its rear open end will be closed by the rear wall portion of said shell. To support and maintain the chute in its normal horizontal position, I provide the shell 2 with an inwardly-extended flange 5, upon which the front under side of the chute will rest, and I also provide said shell with another inwardly-extended flange 6, which will be engaged by the upper side of said chute near its inner end. These flanges 5 and 6 are each provided with a series of transverse ribs 7, designed when the chute is in its normal position to project through slot-openings in the walls of the chute and extend a short distance into the chute. The object of these ribs 7 is to prevent the insertion of a package of a size that would need to be crowded or forced into the chute to engage the walls thereof, and therefore bind to such an extent that the package would not drop into the receptacle when the chute was turned to its vertical position. The under side of the chute 3 is provided longitudinally with a convex rib 8, which bears against the inner edge of the flange 5. This rib 8 is designed to form a closure to prevent the insertion of a wire or similar instrument into the receptacle or between the chute and the inner edge of the flange 5.

When the chute 3 is turned to its vertical position for dropping mail-matter into the receptacle 1, it is of course necessary or preferable to close the outer opening of the shell 2. To such end I provide the chute 3 with a transversely-curved plate 9, having a length somewhat greater than the width of the outer opening of the shell. When the chute is in its normal position, the plate 9 will be extended through a slot in the top of the depositing-receptacle and extended into said receptacle, as plainly indicated in the drawings. When, however, the chute is turned so that its inner open end is extended beyond the inner projection 10 within the shell 2, the said plate will form a closure to the outward opening through the shell. In Fig. 14 I have shown a modification in the construction of this depositing-chute. This particular construction is designed more particularly for use in connection with two depositing-boxes, one of which is arranged on the inner side of a door or other part of a house and the other receptacle on the outer side thereof. In this modification 11 indicates a depositing-receptacle arranged on the outer side of a door, and 12 is a similar receptacle arranged on the inner side of a door. From the boxes 11 and 12 side pieces 13 extend upward and are connected together at the top by means of a transversely-curved plate 14, and the tops of the receptacles 11 and 12 have segmental flanges 15 and 16, respectively. These parts 14, 15, and 16 form substantially a cylinder, which, however, is open at its outer and inner sides. Mounted to rotate in this cylinder is a chute 17, having at its lower end a curved plate 18, movable over the flange 15 and provided with an outwardly-extended finger-piece 19, and at its lower end, opposite the plate 18, is a similar curved plate 20, which extends upward and against the edge of the plate 14.

In the operation of the device, and assuming that a postman desires to deposit letters or mail-matter in the box 12, he will turn the chute to the position noted in full lines in Fig. 14, and when in this position it will be seen that the curved plate 18 effectually closes the opening leading into the top of the box 11, so that the postman is prevented from inserting his hand to remove mail-matter that may be inserted in said box. After depositing the mail-matter in the chute 17 the postman will rotate the chute to the position indicated in dotted lines in Fig. 14. Then of course the mail-matter will drop into the receptacle 12. If a person within a dwelling desires to deposit mail-matter in the receptacle 11, the chute will be turned in an opposite direction to that indicated in the drawings, and then of course, after inserting the mail-matter, the chute can be slightly rotated, so that the said mail-matter will drop into the receptacle 11. At this time the plate 20 will form a closure for the opening leading into the receptacle 12.

Each depositing-receptacle has its bottom wall so arranged that it may be opened for the discharge of mail-matter from the receptacle. In Fig. 2 I have shown a bottom wall 21 hinged at its rear edge to the inner side of the rear wall of the receptacle. Said rear wall, it will be seen, extends a considerable distance below the front end of the lower wall of said receptacle, the object of which will more fully appear hereinafter.

In Fig. 7 I have shown a swinging bottom wall 22, having a hinge connection at its forward edge near the front wall of the receptacle 1, and the said bottom closure or wall 22 is shown as curved rearward and downward. In Fig. 9 I have shown a bottom closure or wall 23, adapted to slide outward in suitable guideways. It is desirable that the bottom walls or closures shall be opened only after the connection of a receiving or collecting receptacle with the depositing-receptacle and after the operation of lock-sections connected to the respective sections.

The receiving-receptacle consists of a bag having a flexible side 24 and a flexible side 25. The flexible side portion 24 is connected to a frame 26, pivoted to a frame 27, to which the flexible side 25 is attached. This pivotal connection consists of a rod 28, extending through the jaws or frames 26 and 27 and having one outwardly-extended end provided with a handpiece 29. The upper ends of the frame-pieces 26 are connected by a casting 30, in which the upper edge of the bag material 24 is clamped. This casting 30 is provided at its central portion with a forwardly and downwardly extended hook 31, so as to be engaged by locking-plates in a lock-section carried on the frame portion 27.

I will now describe the lock and its operation.

The lock consists, as before stated, of two sections, one of which is affixed to the depositing-receptacle and the other of which is attached to one jaw or frame portion of the receiving-receptacle. The section attached to the receiving-receptacle comprises a casing 32, having extended from its inner wall a shelf 33, designed to extend over the hook 31 when said hook is in its locking position, and thus prevent any tampering therewith. The section of the lock on the depositing-receptacle comprises a casing 34, having a forwardly-extended wall 35, open at its front, and into which the casing 32 is designed to pass when the two lock-sections are placed in operative connection.

Mounted to rotate in the casing 32, near one end thereof, is a shaft 36, having a crank-handle 37 on its outwardly-projected end. The inner end of this shaft 36 is provided with a disk 38, and this disk 38, as here shown, has in its center a guide-pin 39, adapted to engage in a correspondingly-shaped depression in a disk 40 on the outer end of the shaft 41, mounted to rotate in the casing 34, and the disk 38 also has a pin 42, designed to engage in a hole 43, formed in the disk 40 near its periphery.

Rigidly mounted on the shaft 41 is a gear-wheel 44, meshing with a gear-wheel 45 on a shaft 46, mounted to rotate in the casing 34, and on the outer end of which is a disk 47, having a hole 48 near its periphery, into which a pin 49, projected from the disk 50, is designed to project. This disk 50 is mounted on a shaft 51, having bearings in the casing 32 at the end opposite that in which the shaft 36 rotates. On the shaft 51 is affixed a gear-wheel 52, meshing with a gear-wheel 53, mounted on a sleeve 54, adapted to rotate on the shaft 36. This sleeve 54 carries a disk 55, extended outwardly from which is a ring-shaped flange 56, the outer surface of which is flush with the outer surface of the disk 38. On this ring-shaped flange 56 is a pin 57, designed to engage in a hole 58, formed in a ring-shaped flange 59, surrounding the disk 40 and attached to a disk 60 on a sleeve 61, mounted to rotate on the shaft 41. On this sleeve 61 is a gear-wheel 62, meshing with a gear-wheel 63 on a sleeve 64, mounted to rotate on the shaft 46.

On the sleeve 64 is a flange 65, which bears a ring-shaped flange 66, having a hole 67, in which a pin 68 on a ring-shaped flange 70 is designed to engage. This ring-shaped flange 70 surrounds the disk 50 and has a flange 71 in connection with a sleeve 72, mounted to rotate on the shaft 51. On this sleeve 72 is a gear-wheel 73, meshing with a gear-wheel 74, mounted on a sleeve 75, adapted to rotate on the sleeve 54. This sleeve 75 has a disk 76, supported on the periphery of which is a ring-shaped flange 77, having an outwardly-extended pin 78, adapted to engage in a hole 79, formed in a ring-shaped flange 80 on a disk 81, mounted to rotate on the sleeve 61. On this disk 81 is a gear-wheel 82, meshing with a gear-wheel 83 on a disk 84, mounted to rotate on the sleeve 64. This disk 84 is provided with a ring-shaped flange 85, provided with a hole 89, into which a pin 90 on a ring-shaped flange 91 is designed to pass. This ring-shaped flange 91 is supported on a disk 92, extended from the sleeve 93, mounted to rotate on the sleeve 72.

It will be seen that the outer surfaces of the several ring-shaped flanges and the outer surfaces of the disks are flush one with another, and the outer ring-shaped flanges of each set are mounted to rotate in openings formed in the front walls of the respective casings.

It will be observed in the drawings that the several gear-wheels vary in size, the idea being to rotate the several disks and ring-shaped flanges at different rates of speed when one lock-section is in connection with the other lock-section, and as the relative rates of speed of each section will be unknown to a person having the section in charge it is obvious that he will be unable to operate the several parts of a section, one part independently of another, to move them in position for releasing the locking devices, to be hereinafter described.

Mounted to rock on a pin 94 and extended upward therefrom is a series of tumbler-levers 95, 96, and 97. The respective tumbler-levers are provided at their upper ends with T-heads 98, 99, and 100. One end of the T-head 98 engages against the periphery of a cam 101, mounted to rotate with the sleeve 75, and the other end of said T-head engages with a cam 102, mounted to rotate with the sleeve 93. One end of the T-head 99 engages with the periphery of a cam 103, mounted to rotate with the sleeve 54, and the opposite end of this T-head 99 engages with the periphery of a cam 104, mounted to rotate with the sleeve 72. One end of the T-head 100 engages with the periphery of a cam 105, mounted to rotate with the shaft 36, and the opposite end of said T-head engages with the periphery of a cam 106, mounted to rotate with the shaft 51. The several cams differ in contour, as will be plainly seen in Fig. 4, and when the several cams are together rotated, and as they have different degrees of movements, it is obvious that the T-heads engaging with opposite cams will not retard their movement; but should a single part be independently rotated it is obvious that the cam carried thereby would cause the T-head of a tumbler-rod to bind together this moving cam and the surface of the stationary cam with which said T-head engages, thus effectually locking the part from further rotation. This is clearly illustrated in Fig. 4, in which it will be noted that by the gear connections the cam 106 will be rotated twice the distance of the cam 105. Should an attempt, however, be made to rotate the disk 38 independently of the other parts, the cam 106, remaining stationary or not recovering the necessary speed, will cause the T-head to bind between the two cams, for the reason that coacting cams have such a relative shape and contour that the space between them will be lessened by such movement of a single part.

I will now describe several locking-plates for engaging with the locking-hook 31, the plates being actuated by the rotary parts heretofore described.

I have here shown three locking-plates 107, 108, and 109, all arranged to slide longitudinally one upon another. These several plates are extended through a slot-opening 110 in the rear wall of the casing 32. Each plate, as indicated in dotted lines in Fig. 5, is provided with a horizontal slot 111, having an outward opening 112. Each plate has a frame portion 113, extended upward in the casing 32, and one end of each frame 113 is provided with an upwardly-extended lug 114, and also near its central portion with an upwardly-extended curved portion 115.

Moving with each cam 102, 104, and 106 is a tappet 116, adapted to engage with the lugs 114 of the frames 113, located immediately below them. It will be seen by this construction that as the parts are rotated the several lugs 114 will be engaged successively by their respective tappets 116. When a tappet engages with the lug 114, the frame 113 will be moved laterally, and consequently its plate will be moved longitudinally to bring its outer opening 112 coincident with the downwardly-projected portion 31, and then the next plate will be similarly moved, and then the third plate will be moved. When all of the outer openings 112 are coincident with the hook 31, it is obvious that the jaws or frame portions of the receiving-receptacle may be opened. As before stated, however, these several movements cannot take place without the coaction of the parts in the casing 34. On the backward movement of each tappet 116 it will engage the upwardly-extended curved portion 115 of its frame and the plate carried by this frame will be moved again to a locking position in connection with the hook 31. The casing 34 also contains locking-plates and cams similar to the cams heretofore described, and also contains tumbler-levers coacting with the cams.

Connected with the gear-wheel 44 is a cam 117, and connected with the sleeve 64 is a cam 118. Connected with the gear 62 is a cam 119, and connected with the gear-wheel 83 is a cam 120. Depending from a shaft 121 in the upper portion of the casing 34 is a tumbler-lever 122, having on its lower end a T-head 123, the ends of which gear respectively with the cams 117 and 118, and also depending from this shaft 121 is a tumbler-lever 124, having a T-head 125 at its lower end having its ends engaged, respectively, with the cams 119 and 120. These cams are variously shaped and have various degrees of movement similar to the cams first described.

Locking-plates 126, 127, and 128 are mounted to move horizontally in the casing 34. These several locking-plates have upwardly-extended frame portions 129, provided with lugs and cam-surfaces similar to the lugs and cam-surfaces 114 and 115 above described and adapted to be engaged, respectively, with tappets 130, 131, and 132. The tappet 130 is mounted to rotate with the gear-wheel 45, the tappet 131 with the gear-wheel 63, and the tappet 132 with the gear-wheel 83. The plates 126, 127, and 128 extend upwardly and the upper surfaces are inclined downward and inward, as plainly indicated in Fig. 3, and each plate is provided in a portion of its length with a recess or notch 133, which when the plates are in a locking position are out of line one with another; but when the said plates are successively moved by the rotation of the parts in the casing 34 these several notches will be brought into line, so that the latch 134 may be moved outward through an opening in the rear wall of the casing 34. The lower edge of this latch 134, it will be seen, is inclined downward corresponding to the inclination of the top surfaces of the several plates. The latch 134 is extended from a link 135, pivotally connected to and extended downward from the free edge of the bottom closure 21 of the depositing-receptacle 1. The lower end of the link 135 is provided with a hook portion 136, which has an outer opening 137, through which a plate 138, carried by the casting 30 on the frame portion 26, is designed to pass.

In operation when the receiving or collecting receptacle is placed in connection with the depositing-receptacle by engaging the two lock-sections, as indicated in Fig. 3, upon rotating the several rotary parts in said lock-sections by means of the crank 37 the several locking-plates 107, 108, and 109 will be successively moved out of locking engagement with the hook 31, and at the same time the several locking-plates 126, 127, and 128 will be moved out of locking engagement with the latch 134. Then by operating the handle 29 the jaw portion 26 of the receiving-receptacle will be moved to its open position, as indicated in dotted lines in Fig. 2. At the starting of this movement the plate 138 will pass into the hook 136, and thus the bottom closure 21 will be carried downward to open the receptacle 1, allowing the contents thereof to drop into the receiving-receptacle. Of course during this downward or opening movement the plate 138 will have a rotary motion in the hook portion 136. This is permitted by the fact that the plate 138 has a space between it and the upwardly-extending wall of the casting 30, the plate 138 being supported on said casting by means of connections at the ends, the length of the space between said connections of course being greater than the length of the hook 136, as plainly indicated in Fig. 13.

It is designed in practice that the collections taken into the collecting-receptacle shall be limited to a certain number of depositing-receptacles, and therefore I provide means to prevent an operation of the locking mechanism after said limit shall have been reached. As here shown, this means consists of a ratchet-wheel 139, mounted to rotate on the stud 94. This ratchet-wheel is provided on its outer surface with a series of figures, here shown as ranging from "1" to "12," and these numbers may be consecutively seen through an opening 140 in front of the casing 32. This ratchet-wheel 139 is rotated one step at each complete releasing movement of the locking-plate 109 by means of a spring-pressed dog 141, pivoted to the frame 113 of said plate 109 and adapted when said plate and frame are moved longitudinally to engage with a tooth of the ratchet-wheel. This ratchet-wheel is held from backward rotation by means of a pawl 142, pivoted to a stud extended inward from the front wall of the casing 32 and pressed yieldingly against the ratchet-wheel by means of a spring, as plainly indicated in Fig. 4.

On the inner side of the ratchet-wheel 139 is a disk 143, provided with a notch 144, into which the free end of an angle-lever 145 is adapted to engage when the ratchet-wheel shall have made one complete rotation. Therefore it will be seen that after twelve collections shall have been made a complete movement cannot be imparted to the locking-plate 109 because the dog 141 will engage with the ratchet-wheel without imparting rotary motion to said ratchet-wheel. The angle-lever 145 is pivoted on the lug to which the pawl 142 is pivoted, and this angle-lever has a curved portion 146 extended above its pivot-point and adapted to be engaged by a boss 147, extended from a cylinder adapted to be rotated by means of a key inserted through the front wall of the casing 32. As the free end of the lever 145 is pressed and held yieldingly against the periphery of the disk 143 by means of a spring, as shown in Fig. 4, it is evident that the free end of said lever will be forced into the notch 144 when said notch reaches the free end of said lever. Of course the proper official or superintendent at the main office will be supplied with a key for releasing the lever 145, so that the ratchet-wheel may be rotated or returned to its starting position and be ready for a subsequent collection.

Upon each operation of the locking mechanism it is also designed to operate an indicator giving information as to when the next collection will be made. This means consists of a ratchet-toothed wheel 148, mounted to rotate on the shaft 121 in the casing 34. This wheel 148 has marked on its outer surface the hours of the day, which may be seen successively through an opening in the front wall of the casing 34. To impart a step-by-step motion to this wheel 148, I employ a lever 149, pivoted in the casing 34 and carrying at its upper end a spring-pressed pawl 150, engaging with the teeth of the wheel 148. The pivotal end of this lever 149 is provided with diverging fingers 151 and 152, designed to be engaged by a pin 153, extended inward from the gear-wheel 82. During the rotary movement in one direction of said gear-wheel 82 the pin 153 will engage with the finger 151 and rock the lever 149, causing the pawl 150 to rotate the wheel 148 one step. On the backward movement of said gear-wheel 82 the pin 153 will engage with the finger 152 and return the lever 149 to its normal position or in engagement with the next tooth of the series on the wheel 148.

While the several parts of the lock mechanism are in engagement it is desirable to secure the two sections so that they cannot be separated until the parts are operated to put them in locking position. As a means therefor I employ a lever 154, pivoted to the inner side of the casing 32 and having an upwardly-extending arm 155 passing through an opening in the upper wall of the casing 32 and adapted to be moved into a recess 156, formed in the upper wall of the flange 35. The free end of this lever has a hook portion 157, which bears on the periphery of a disk 158, mounted to rotate with the shaft 36. When the parts are placed together and the shaft 36 rotated in the direction of the arrow $a$, (shown on the disk 158,) the said lever will be elevated out of the notch 159, formed in the periphery of the disk 158, and this upward movement of the lever will of course move the arm 155 into the opening 156, where it will remain during the entire movement of the disk 158, and when the parts are reversed to lock the several devices the hook end 157, after the complete reverse movement of the disk 158, will drop into the notch 159. This of course will move the part 155 out of engagement with the opening 156, so that the collecting-receptacle, with its lock-section, may be removed.

As before stated, it is designed that a certain collecting-receptacle shall be employed with a certain number of depositing-receptacles, and in order to insure that the collections shall be made in the consecutive order of the depositing-receptacles I employ a means which after the unlocking and locking operation during one collection will be automatically rotated one step to prepare it for connection with the next depositing-receptacle of the series on the route. As here shown, this means consists of a ratchet-wheel 160, mounted on a shaft 161, having a bearing through the rear wall of the casing 32 and provided at its outer end with a disk 162, having a pin 163 extended from it near its periphery. This disk 162 is seated in a recess formed in the rear wall of the casing, so that the outer side of said rear wall and the face of the disk will be flush. The pin 163 is adapted to engage in an arc-shaped slot formed in the front wall portion of the lock-section casing 34, and of course the slots of the different depositing-receptacles will be in positions differing one from another—that is, in the different degrees of a circle, as indicated in Figs. 10 and 11ª.

The arc-shaped slot is to allow for the movement of the disk to put it into position for connection with the next depositing-receptacle, and it is to be understood that the same result would obtain were the slot formed in the disk and the pin on the depositing-receptacle.

As a means for imparting a step-by-step movement to the ratchet-wheel 160 and consequently moving the pin 163 one step farther to be engaged in the next succeeding depositing-receptacle I employ a pawl 164, pivotally connected to the frame 113 of the locking-plate 107. This pawl 164 is supported on a pin extended from said frame 113 and is pressed yieldingly downward by means of a spring 165, having one end secured to said frame. At each unlocking movement of the plate 107 the pawl 164, engaging with a tooth of the wheel 160, will rotate it one step.

On the shaft 161 rearward of the wheel 160 is mounted a toothed wheel 166, designed, in connection with a dog 167, to lock the wheel 160 and prevent its backward or forward movement excepting upon the operation of the locking mechanism. This dog 167 has a tooth adapted to engage between teeth of the wheel 166 and is automatically moved into such engagement by means of a spring 168, bearing against the portion of said dog extended below its pivotal point. To release the dog 167 from the wheel 160 before the pawl 164 shall have come into operative connection with the wheel 160, I provide a push-rod 169, which extends from the frame 113, upon which the pawl 164 is mounted. This push-rod 169 of course comes in contact with the lower end of the dog 167 and will force its toothed end out of engagement with the wheel 160. Then on the continued movement of the frame 113 the wheel will be operated as before described.

I will now describe the modification shown in Figs. 6, 7, 8, and 9. In these figures the lock-operating mechanism is the same as that heretofore described, the main features of the modification being confined to the bottom closure or door. In Figs. 6 and 7 the bottom closure or door 22 is curved downward and rearward, and at its front end it has a rigid connection 170 with a bar extended across the receptacle 1. This rigid connection consists of a plate extended upward from the closure 22 and then forward and then turns around the bar which extends across the receptacle 1 and has a bearing in the side walls thereof. The lower end of this closure 22 normally engages against the lower portion of the back wall of the receptacle 1. Mounted on the upper side of the closure 22 is a locking-bar 171. This extends through a suitable guide on the closure 22 and is designed to engage in a hole or recess formed in the back wall of the receptacle 1. The opposite end of this locking-bar 171 is pivotally connected to a bell-crank lever 172, pivoted to a lug on the upper side of the closure 22, and having extended from its other arm a bolt 173, which extends through an opening in the plate 170. This bolt 173 projects through a slot in the rear wall of the lock-casing 34 and in the line of movement of the gear-wheel 44, which in this instance is provided at one side with a radial slot 174. Surrounding the bolt 173 between the plate 170 and the collar on said bolt is a spring 175, which normally presses said bolt outward and consequently forces the locking-bar 171 into locking position. A lug 176 extends upward from the bolt 173 into a hole formed on the lower side of the plate 170, as plainly indicated in Fig. 7.

In operation after the lock-operating wheels shall have made one complete rotation to unlock the parts the slot 174 in the wheel 44 will be in line with the end of the bolt 173, and then after moving the jaw 26 of the collecting-receptacle to its open position by grasping and turning a hand-lever 177 on the outer end of the shaft to which the plate 170 is connected the bottom closure 22 may be turned down to the position indicated in dotted lines in Fig. 7. Of course at the initial movement of the hand-lever 177 the wall of the hole or opening in the plate 170, engaging against the lug 176, will force the bolt 173 longitudinally through the slot 174 of the wheel 44, and this movement of the bolt will rock the bell-crank lever 172 and draw the locking-bar 171 out of its locking position. When the jaw 26 is in its open position, it is necessary to lock the same to prevent a person from forcing the said jaw upward and thus gaining access to the receptacle. As a means therefor I employ a hook 178, pivoted in a recess formed in the back wall of the receptacle 1 and adapted to engage in a hole 179, formed in the casting or cross-bar 30, which extends between the frame-sections 26. The inner edge of this hook 178, near its pivotal point, is provided with a hook portion 180, designed to be engaged by a pin 181, extended from one edge of the closure 22. When the said closure 22 is in its closed position, the pin 181 will hold the hook 178 within the recess, as indicated in Fig. 12. As said closure 22, however, is moved toward its open position, the pin 181, engaging with the hook portion 180, will move the locking-bolt 173 into the slot 179. When the closure 22 is returned to its closed position, the pin 181 will engage with the body portion of the hook 178 and force it back into the recess and consequently out of the hole 179, so that the jaw portion 26 may be moved to its closed position.

In Figs. 8 and 9 the bottom closure 23 is made to move laterally outward in relation to the receptacle 1. This bottom closure 23 is transversely grooved, and at its upper forward edge it has an L-shaped flange 182, engaging over a slide-flange on the inner side of the receptacle 1, and the lower edge of this closure slides in a groove formed in the lower end of the back wall of the receptacle. At each end the under side of this closure 23 is provided with a channel or groove 183, which extends from the upper to the lower edge of said closure and into which lugs 184 on the frame-section 26 engage and are adapted to move as the frame-section is moved to its open position. A locking-bolt 185, operated vertically through an opening in the bottom wall of the casing 34, is adapted to pass through a recess formed in the upper side of the sliding closure 23. After operating the lock mechanism to raise this bolt 185 and also to release the jaw-section 26 of the collecting or receiving sections the said jaw 26 may be moved downward, and during this movement the lugs 184, projecting into the slot 183, will prevent an outward movement of the closure 23. This outward movement can only take place after the closure shall have reached the limit of its opening movement. Then said lugs 184 will come in line with the longitudinal groove 186, formed near the lower edge of the closure 23. At this time by taking hold of the handle 187 the closure may be drawn outward and the mail-matter be allowed to fall into the receiving-receptacle.

In the modifications shown in Figs. 16 and 17 I have provided a locking mechanism adapted to be operated by a key instead of by a crank, as in the example first described. In this modification a shaft 190 is mounted to rotate in the casing 32. The inner end of this shaft 190 is provided with a disk 191, having a pin 192, adapted to engage in a perforation in a disk 193 on a shaft 194, mounted to rotate in the casing 34. The shaft 190, at its end opposite that having the disk, is provided with a gear-wheel 195 and also with a cam 196. The shaft 194, at its end opposite that having the disk, is provided with a gear-wheel 197 and also with a cam 198. Mounted to rotate on the shaft 190 is a sleeve 199, having at one end a gear-wheel 200 and also a cam 201. At its opposite end this sleeve is provided with a ring-shaped flange 202, having a pin adapted to engage in a perforation in a ring-shaped flange 203, mounted on a sleeve 204, mounted to rotate on the shaft 194. The inner end of this sleeve 204 is provided with a gear-wheel 205 and also with a cam-wheel 206. Mounted to rotate on the sleeve 199 is a sleeve 207, having at its inner end a gear-wheel 208 and a cam 209. At its opposite end the said sleeve 207 is provided with a ring-shaped flange 210, having a pin for engagement in a perforation in a ring-shaped flange 211 on a sleeve 212, mounted to rotate on the sleeve 204. This sleeve 212 is provided with a gear-wheel 213 and also with a cam 214.

Mounted to rotate on the sleeve 207 is a sleeve 215, having at its inner end a cam 216 and at its opposite end a ring-shaped flange 217, upon which is mounted a gear-wheel 218. This ring-shaped flange 217 is also provided with a pin to engage in a perforation in a ring-shaped flange 219, mounted to rotate on the sleeve 212. This ring-shaped flange 219 carries a gear-wheel 220 and also carries a cam 221.

Movable horizontally in the casing 32 are locking-plates 222, 223, 224, and 225. The locking-plate 222 has a rack portion 226 meshing with a gear-wheel 218, the locking-plate 223 has a similar rack portion meshing with the gear-wheel 208, the locking-plate 224 has a rack portion meshing with the gear-wheel 200, and the locking-plate 225 has a rack portion meshing with the gear-wheel 195.

In the casing 34 are horizontally-movable locking-plates 227, 228, 229, and 230. The locking-plate 227 has a rack portion meshing with the gear-wheel 197, the locking-plate 228 has a rack portion engaging with the gear-wheel 205, the locking-plate 229 has a rack portion meshing with the gear-wheel 213, and the locking-plate 230 has a rack portion meshing with the gear-wheel 220.

As in the example first described, the several locking-plate-operating devices are designed to rotate at different speeds or at different distances one relatively to the other, and for this purpose I employ a key 231, provided with a series of guards or fingers 232, 233, 234, and 235. Each guard or finger has its end turned substantially at right angles to its body portion, the said ends being adapted to engage in cam-slots formed in certain of the gear-wheels. It may be here stated that the cam-slots of the various gear-wheels differ in their trend, or, in other words, are so formed that the rotary movement of the key will impart a greater movement to one gear-wheel than to another. One of these cam-slots is shown at 236 in Fig. 17. The guard or finger 234 is here shown as engaging in a slot formed in the gear-wheel 197, the guard 233 as engaging in a slot formed in the gear-wheel 213, the guard 234 as engaging in a slot in the gear-wheel 218, and the guard 235 as engaging in a slot in the gear-wheel 200.

Of course the front wall of the casing 32 will be provided with a suitable opening for the insertion and withdrawal of the key. As in the example first described, the cam-wheels of this modification differ in contour one relatively to another, but as the several cams rotate on the same center the means for locking the same, should an attempt be made to rotate one of the rotary parts independently of the other, must differ in construction somewhat from the tumbler-levers and T-heads first described. I have shown such devices as consisting of the pivoted levers 237, each having oppositely-extended and converging fingers 238 239. The finger 238 of one lever engages with the cam 201, and the finger 239 of the same lever engages with the cam 196. The next lever 237 in the casing 32 has one of its fingers engaging with the cam 216 and the other of its fingers engaging with the cam 209. In the casing 34 a similar lever 237 has one of its fingers engaging with the cam 214 and the other of its fingers engaging with the cam 221. The other lever of said casing 34 has one of its fingers engaging with the cam 198 and the other of the fingers engaging with the cam 236. It will be observed in Fig. 17 that the ends only of the fingers engage with the periphery of the cams.

It has not heretofore been stated, but it is to be understood, that the construction of the lower portion of the receptacle 11 (shown in Fig. 1) will be similar to that of the receptacle 1 and that a collecting-receptacle is designed to be engaged therewith.

I have described my device as particularly useful or adapted for the collection of mail-matter, but it is obvious that it may find many other useful places—such, for instance, as in express-offices.

Having thus described my invention, I claim as new and desire to secure by Letters Patent—

1. A depositing-receptacle for mail-matter, comprising a box having a cylindrical portion at its upper end, the said cylindrical portion having an outward opening, a chute mounted to rotate in said cylindrical portion, the said chute being open at its sides and a curved plate carried by the chute to close an opening, substantially as specified.

2. A depositing-receptacle for mail-matter, comprising a box having a cylindrical portion at its upper end, an open-sided chute mounted to rotate in said cylindrical portion, an inwardly-extended flange in the said cylindrical portion with which the lower side of said chute is designed to engage, an inwardly-extended flange in said cylindrical portion with which the upper side of said chute is designed to engage and a curved plate on the chute movable through a slot in the top wall of the box, substantially as specified.

3. A depositing-receptacle for mail-matter, comprising a box having a cylindrical portion at its upper end provided with an outward opening, an open-sided chute mounted to rotate in said cylindrical portion, a flange extended inwardly in said cylindrical portion and against which the front under side of the chute is designed to rest, and a series of transverse ribs on said flange adapted to pass through slot-openings in the wall of the chute and to project into said chute, substantially as specified.

4. A depositing-receptacle for mail-matter, comprising a box having a cylindrical portion at its upper end provided with an outward opening, an open-sided chute mounted to rotate in said cylindrical portion, a handpiece for rotating said chute, a flange extended inward within said cylindrical portion, and upon which the lower side of the chute is designed to engage, transverse ribs on said flange designed to pass through slot-openings in the lower wall of the chute, another inwardly-extended flange in said cylindrical portion, transverse ribs thereon adapted to pass through slot-openings in the upper wall of the chute, and a rib on the lower wall of the chute adapted to move against the inner edge of the first-named flange, substantially as specified.

5. A depositing-receptacle for mail-matter, comprising a box having a cylindrical portion at its upper end provided with an outward opening, an open-sided chute mounted to rotate in said cylindrical portion, means for supporting said chute at a normally-horizontal position, and a transversely-curved plate on said chute, movable through a slot-opening in the upper side of the box and adapted to close the outward opening of the cylindrical portion, substantially as specified.

6. A depositing-receptacle for mail-matter, comprising a box, a wall portion thereof being adapted to be moved relatively to the box, a receiving-receptacle having hinged jaw-frames adapted for connection with said box, a shaft on which the jaw-frames are hinged, a handpiece on the shaft, a lock mechanism on the box, and a lock mechanism on the receiving-receptacle adapted for coaction with the lock-section on the box, substantially as specified.

7. A mail-collecting device, comprising a depositing-receptacle having a bottom wall adapted to open, a collecting-receptacle having hinged jaw portions adapted to open, a lock-section on the depositing-box, for locking the bottom closure thereof, a lock-section on the receiving-receptacle, for locking the jaws thereof, the said two locking-sections being adapted to coact one with the other, and means consisting of a rotary shaft carrying the jaws for simultaneously opening the bottom closure of the depositing-receptacle and the jaws of the receiving-receptacle after operating the locking mechanism, substantially as specified.

8. A lock, comprising two separable casings, rotary parts in each casing comprising ring-shaped flanges, the rotary parts in one casing being dependent on the rotary parts in the other casing, differentiating gear-wheels for operating the several rotary parts at different rates of speed, and locking devices operated by the rotary parts in each casing, substantially as specified.

9. A lock, comprising two separable casings, rotary parts in each casing, the rotary parts in one casing being dependent on the rotary parts in the other casing, differentiating gear-wheels carried by the rotary parts for operating said rotary parts at different rates of speed one relatively to another, rotary cams and swinging levers for locking the rotary parts should one rotary part be moved independently, and locking devices operated by the rotary parts in each casing, substantially as specified.

10. A lock, comprising two separable casings, rotary parts in each casing, the rotary parts in one casing being dependent for operation on the rotary parts in the other casing, means for operating the rotary parts together at different rates of speed, cams carried by certain of said rotary parts, swinging tumbler-levers adapted to engage with opposite cams, and locking-plates operated by said rotary parts, substantially as specified.

11. A lock, comprising two separable casings, rotary parts in each of said casings, the rotary parts in one casing being dependent for operation upon the rotary parts in the other casing, means for operating said rotary parts together at different rates of speed, locking-plates movable by said rotary parts, a consecutively-numbered ratchet-wheel, a spring-pressed dog carried by one of the locking-plates and adapted to impart a step-by-step motion to said ratchet-wheel, and means for automatically locking said ratchet-wheel after it shall have made a complete rotation, substantially as specified.

12. A lock, comprising two sections consisting of rotary parts, the rotary part of one section being dependent for operation upon the rotary parts of the other section, means for operating the several rotary parts together and at different rates of speed, locking-plates operated by the rotary parts, a toothed wheel having a series of figures on its outer side, a dog carried by one of said locking-plates and adapted for engagement with a tooth of said wheel, a pawl for holding said wheel from backward rotation, a notched disk carried by said wheel, and a pivoted angle-lever adapted for engagement with said notch upon a complete rotation of the wheel, substantially as specified.

13. A lock, comprising two separable casings, rotary parts in each of said casings, the rotary parts in one casing being dependent for operation upon the rotary parts in the other casing, means for operating said rotary parts together, locking-plates operated by said rotary parts, a disk mounted to rotate in one of the casings and having an outwardly-extended pin near its periphery, a ratchet-wheel on the shaft of said disk, means carried by one of the locking-plates, for imparting a step-by-step motion to said ratchet-wheel, and a locking device for said ratchet-wheel operated in one direction by a movement of the locking-plate, substantially as specified.

14. A lock, comprising two separable sections, rotary parts in each of said sections, the rotary parts of one section being provided with projections to engage in openings in the rotary parts in the other section, and means operated by one of the rotary parts for locking said sections together, substantially as specified.

15. A lock, comprising two casings, rotary parts in each of said casings, the operation of the rotary parts in one casing being dependent upon the operation of the rotary parts in the other casing, locking-plates operated by the rotary parts in each casing, a lever pivoted in one of the casings, an arm extended therefrom and adapted to engage with a portion of the other casing, and a disk on one of the rotary parts for controlling the movements of said lever and locking-arm, substantially as specified.

16. A depositing-receptacle for mail-matter, comprising a casing, a swinging bottom closure therefor, a link connected to said bottom closure, a lock-section on said receptacle having locking-plates for engagement with said link, a collecting-receptacle adapted for engagement with the depositing-receptacle, a lock-section on said collecting-receptacle, locking-plates for securing together the jaws of said collecting-receptacle, and means for simultaneously operating the two locking devices, substantially as specified.

17. A lock, comprising two casings, rotary parts in each casing, the said rotary parts of each casing being mounted to rotate one upon another, and the rotary parts in one section being dependent for operation upon the rotary parts in the other casing by an interlocking engagement of the parts in one casing with those of the other, substantially as specified.

18. A locking device, comprising two separable casings or sections, rotary movable parts in each of said casings or sections, said movable parts being movable only when the two casings or sections are in connection, the rotary parts of a section having intermeshing gear-wheels and locking plates or devices movable only when the two sections or casings are in connection, substantially as specified.

19. A depositing-receptacle for letters or the like having a door-closed opening and a door therefor consisting of one portion having a swinging connection with the receptacle, another section having a swinging connection with the first-named section, a receiving-receptacle having jaws, and means for connecting one of said jaws for movement with the door of the depositing-receptacle, substantially as specified.

20. A depositing-receptacle for letters or the like having a door-closed opening and a door therefor consisting of one portion having a swinging connection with the receptacle, another section having a swinging connection with the first-named section, a receiving-receptacle having jaws, means for connecting one of said jaws for movement with the door of the depositing-receptacle, and side walls or leaves depending from the depositing-receptacle to prevent access to either of the receptacles when open, substantially as specified.

21. A series of depositing-receptacles, a receiving-receptacle adapted for engagement with each one of the series of depositing-receptacles, locking devices on the receptacles, a movable part on the receiving-receptacle and operated by the locking mechanism thereof, and means for providing a pin-and-slot engagement between the movable part and a depositing-receptacle, substantially as specified.

22. A mail-box, having a central partition forming two compartments, side pieces extended upward from the box, a curved plate connecting the side pieces at the top, segmental flanges at the tops of the compartments, the space between the flanges providing communication with the compartments, a chute open at both its sides, and curved plates on the lower side of said chute, both adapted to close the communicating openings of both compartments, substantially as specified.

DETALMO DI BRAZZA SAVORGNAN.

Witnesses:
JNO. M. RITTER,
C. R. FERGUSON.